United States Patent Office 3,257,628
Patented June 21, 1966

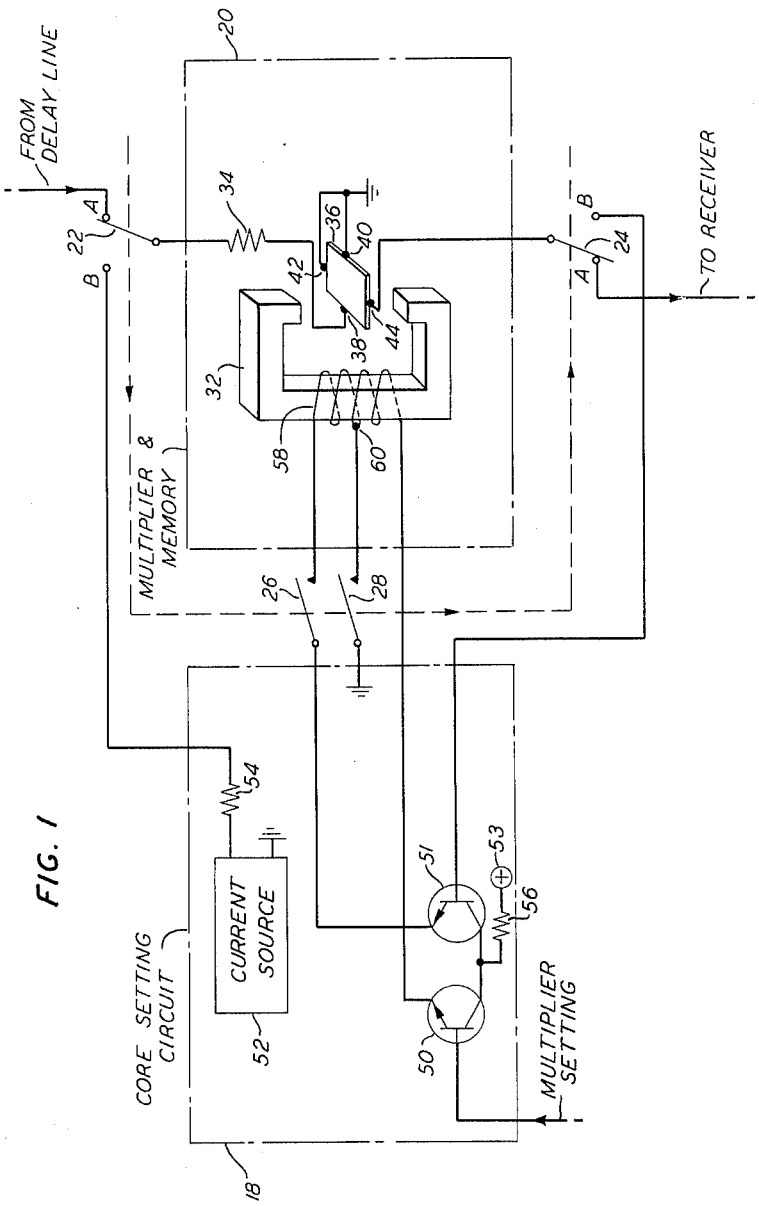

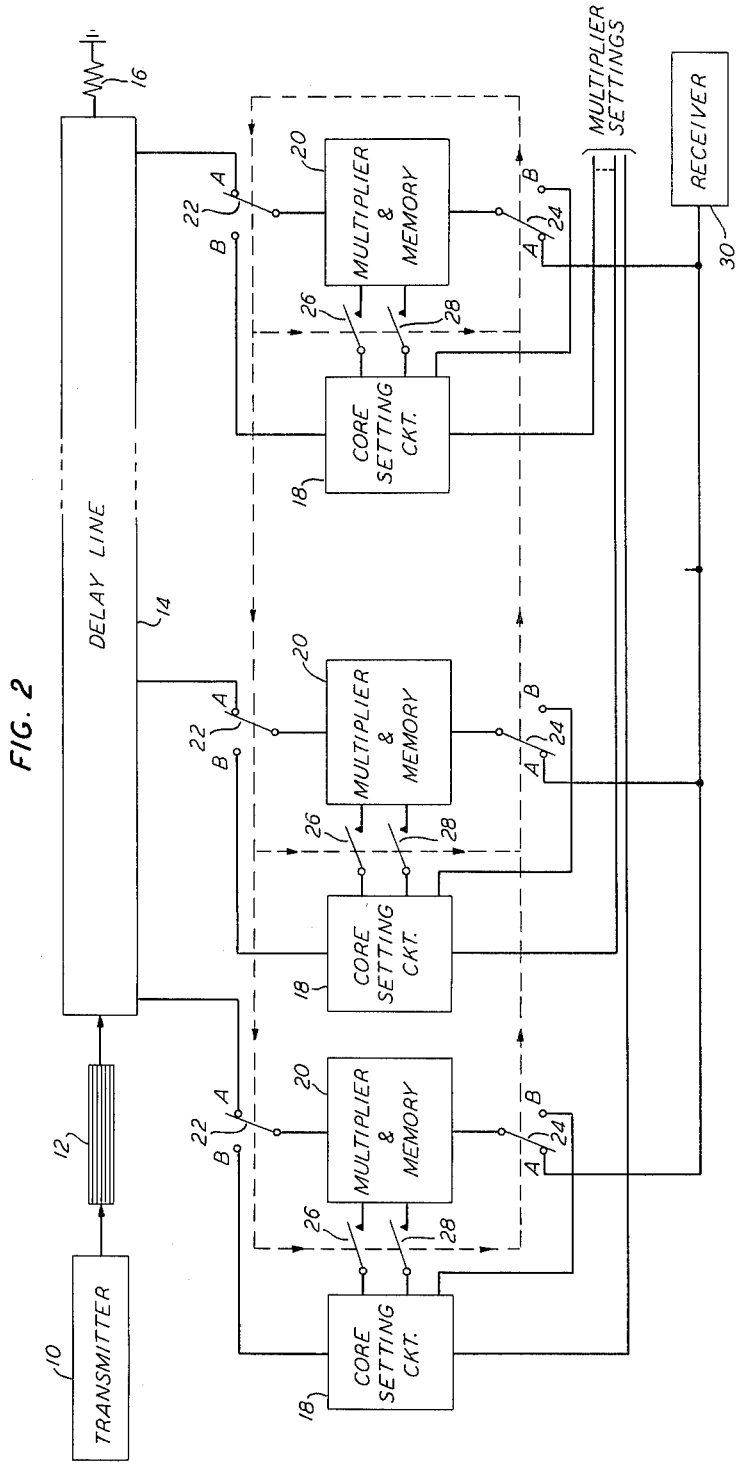

3,257,628
RESETTING CIRCUITRY FOR A SQUARE-LOOP FERROMAGNETIC CORE UTILIZING THE OUTPUT OF A HALL PLATE
Reginald A. Kaenel, Bethesda, Md., assignor to Bell Telephone Laboratories, Incorporated, New York, N.Y., a corporation of New York
Filed May 21, 1963, Ser. No. 281,999
6 Claims. (Cl. 333—17)

This invention relates to feedback control circuitry and more particulary to such circuitry employed to set a square-loop ferromagnetic core to meet a prescribed condition.

One type of adaptive circuit element is composed of a thin, semiconductor plate exhibiting the Hall effect situated in the gap space of a square-loop ferromagnetic core. Electrical current is applied to a pair of input terminals at opposite ends of the semiconductor plate. A voltage proportional to the vector cross product of the input current and the magnetic flux passing through the core appears at the output terminals, located at opposite ends of the semiconductor plate and perpendicular to the input terminals. Such a device finds application, for example, as the signal multipliers of a transversal filter equalizer in U.S. Patent 2,908,873, issued October 13, 1959, to B. P. Bogert and assigned to the assignee of this application.

In order to control the multiplication factor introduced by this adaptive circuit element the magnetization curve of the core and the characteristics of the semiconductor material must be known because the multiplication factor depends upon them. Usually this information is determined by measurement. In applications such as the transversal filter where many multipliers are called for, measurement of these characteristics entails a great deal of human labor. Furthermore, due to changes in characteristics caused by component aging or variations in ambient temperature these measurements might have to be repeated from time to time.

The hysteresis exhibited by ferromagnetic cores ordinarily makes reset circuitry necessary to demagnetize the cores prior to setting them.

It is therefore the object of the present invention to set the magnetic flux in a square-loop ferromagnetic core without detailed knowledge of the characteristics of the circuit elements, particularly the core, and to eliminate the need for reset circuitry.

In accordance with the above object, an adaptive circuit element is provided comprising a square-loop ferromagnetic core and a rectangular semiconductor plate exhibiting the Hall effect situated to intersect the path of the magnetic flux existing in the core. A current source is coupled to input terminals attached to opposite ends of the semiconductor plate, such that current travels between them transverse to the intersected flux path. Output terminals are attached to opposite ends of the semiconductor plate perpendicular to the ends to which the input terminals are attached, such that current generated due to the Hall effect also travels between them transverse to the intersected flux path. The Hall effect voltage appearing across the output terminals is applied to one input of a difference amplifier, to the other input of which is applied a voltage representative of the multiplication factor desired to be introduced by the adaptive element. The output from the difference amplifier controls core-driving circuitry that changes the flux flowing in the core until the multiplier-setting voltage and the output voltage from the semiconductor plate are in agreement. Thus, each time a new multiplier-setting voltage is to be introduced, the flux in the core is adjusted to a value that produces the multiplication factor represented by the multiplier setting without regard to the prior magnetization state of the core or the details of the magnetization curve, i.e., hysteresis loop, of the core.

These and other features of the invention will become apparent in the course of the following detailed description taken in conjunction with the drawings in which:

FIG. 1 is a schematic diagram of an adaptive circuit element and ferromagnetic-core-setting circuitry arranged in accordance with the principles of the invention; and FIG. 2 is a schematic diagrarm in block form of the core-setting circuitry of FIG. 1 employed in a transversal filter equalizer.

In FIG. 2 core-setting circuitry, designated by blocks 18, is shown as being available to adjust or set adaptive circuit elements, i.e., multiplier and memory blocks 20, in a transversal filter. A transmitter 10 is connected to the input of a transmission medium 12 that introduces transmission distortion. At the output of transmission medium 12 a conventional transversal filter is situated to operate upon the transmitted signals before application to a receiver 30. The transversal filter comprises a delay line 14, terminated in its characteristic impedance by a resistor 16. Taps made along the length of delay line 14 at intervals of transmission time delay less than the reciprocal of twice the highest frequency component conveyed through medium 12 are connected to the inputs of multiplier and memory blocks 20 through switches 22 while in state A, as shown. The outputs of blocks 20 are all combined and applied to the input of receiver 30 through switches 24 while in state A, again as shown in FIG. 2. As is well known, the transmission characteristics of the transversal filter are determined by the multiplication factors introduced by multiplier and memory blocks 20. When it is desired to effect a change in the transmission characteristics of the transversal filter responsive to electrical multiplier-setting signals, the core-setting circuitry blocks 18 are brought into action by changing the state of all theswitches, shown as ganged together by dashed lines. After the conversion is brought about, switches 22 and 24 are in state B, thus disconnecting the mutliplier and memory circuitry from the transversal filter, and switches 26 and 28 are closed, thus engaging the core-setting circuitry for control of the multiplier and memory circuitry. These switches could be operated manually or made responsive to an electrical command signal made available in conjunction with the multiplier-setting signals.

The details of the cricuitry of blocks 18 and 20 are shown in FIG. 1. In block 20 a square-hysteresis-loop ferromagnetic core 32 having a gap interrupting its continuity is provided to store a residual magnetic flux representative of the multiplication factor to be introduced. The gap is shown exaggerated in length in the drawing for clarity of illustration. A thin rectangular semiconductor slab 36, exhibiting the Hall effect, is placed in the gap of core 32 so flux flowing across the gap passes through slab 36 perpendicular to its faces. Input terminals 38 and 40 are attached to one pair of opposite edges of slab 36 and output terminals 42 and 44 are attached to the other pair of opposite edges of slab 36. Switch 22 is connected to input terminal 38 through an input resistor 34. The other input terminal 40 is grounded. One output terminal 44 is coupled to switch 24 and the other output terminal 42 is grounded. It is well known that the output voltage generated across terminals 42 and 44, $$V = KI\Phi \sin \theta$$

where $\Phi$ is the flux of core 32 flowing through semiconductor slab 36, $I$ is the current flowing through semiconductor slab 36 between input terminals 38 and 40, $\theta$ is the angle between the vectors representing $\Phi$ and $I$, and $K$ is a proportionality constant dependent upon the characteristics of slab 36. Thus the circuitry in block 20 can be employed to multiply the signals, represented in the equation by I, tapped from the delay line of a transversal filter by a factor depending upon the residual flux stored in core 32.

When it is desired to set the residual flux in core 32 to a new state, switches 22 and 24 are placed in state B and switches 26 and 28 are closed. The output from a current source 52, which for example could be a direct-current current of known and constant value, is applied through a current-limiting resistor 54 and switch 22 to input terminals 38 and 40 of slab 36. As a result, a voltage, which is proportional to the instantaneous value of flux existing in core 32, is generated across output terminals 42 and 44. This voltage is a measure of the multiplication factor introduced as a reseult of the flux existing in core 32.

The multiplier-setting signal, representative of the multiplication factor that is desired to be introduced by the multiplier, is applied to the base of a transistor 50, which constitutes one input of a difference amplifier. This signal would be a direct-current voltage equal to the product of the multiplication factor desired, in ohms, and the direct-current current emanating from the output of source 52, in amperes. The output voltage generated across terminals 42 and 44 is applied to transistor 51, which constitutes the other input of the difference amplifier, by virtue of a connection through switch 24 when in state B to the base of transistor 51. The collectors of transistors 50 and 51 are provided bias through a common current-limiting resistor 56 by a source 53 of positive direct-current voltage and the emitters of transistors 50 and 51 are connected to opposite end terminals of a coil 58 wound around core 32. A center tap 60 on coil 58 is connected through switch 28 to ground.

Current, dependent in magnitude upon the multiplier-setting voltage, flows from the emitter of transistor 50 through the lower half of coil 58 to point 60 and ground, thus giving rise to a proportional magnetic field intensity. Likewise current, dependent in magnitude upon the Hall effect voltage generated by slab 36, flows from the emitter of transistor 51 through the upper half of coil 58 to point 60 and ground, giving rise to a proportional magnetic field intensity opposite in sense to the magnetic fiield intensity caused by current flow through the lower half of coil 58. Thus, the net magnetic field intensity is proportional to the difference between the current flowing through the two halves of coil 58 and in turn the discrepancy between the multiplier setting and the actual multiplication factor introduced by multiplier and memory circuitry 20. The magnetic field intensity created by coil 58 changes the magnetic flux in core 32 to bring the actual multiplication factor closer and closer to the value indicated by the multiplier setting, by operation of the feedback control circuitry described, until the multiplier-setting voltage and the voltage generated across terminals 42 and 44 of slab 36 are equal, leaving a net magnetic field intensity of zero and a residual magnetic flux in core 32 sufficient to provide the multiplication factor called for by the multiplier-setting voltage.

This control circuitry establishes the flux in core 32 necessary to effect multiplication independent of the details of the square-loop magnetization curve of core 32, the characteristics of semiconductor slab 36, and the initial magnetization of core 32. Thus, no resetting circuitry is required, because the core setting operation can commence from any initial state of magnetization.

A copending patent application of mine (Serial No. 246,378, filed December 21, 1962, entitled Transversal Filter) discloses and claims core setting circuitry related to that of this application.

What is claimed is:

1. A control circuit comprising a high-retentivity ferromagnetic core element storing information represented by residual magnetic flux flowing therethrough, a first source of electrical reference signals for indicating the desired level of residual flux in said core, a semiconductor element exhibiting the Hall effect situated to intersect the path of flux flowing through said core and providing a second source of electrical signals representative of the residual flux actually flowing in said core, a difference amplifier for comparing said second signal with said first signal, said difference amplifier comprising first and second transistors the collectors of which are provided operating bias, said difference amplifier having as its two input signals said first and second signals, said difference amplifier having a first output terminal connected to the emitter of said first transistor and a second output terminal connected to the emitter of said second transistor, and means responsive to the signals appearing on said first and second output terminals of said difference amplifier for readjusting the flux in said core to reduce the discrepancy between the desired and actual levels, whereby a residual flux is established in said core that results in said second signal equaling said reference signal.

2. Apparatus comprising a high-retentivity ferromagnetic core, a semiconductor element exhibiting the Hall effect situated to intersect the path of flux flowing through said core, means for developing an output voltage across said element proportional to the residual flux of said core passing therethrough, a source of reference voltage representative of a residual flux to be established in said core, means for generating a first error signal proportional to the difference between said reference voltage and said output voltage whenever said reference voltage exceeds said output voltage, means for generating a second error signal proportional to the difference between said reference voltage and said output voltage whenever said output voltage exceeds said reference voltage, a coil having end terminals and a center tap and which is wound around said core, circuit means for connecting the source of said first error signal across one of said end terminals and said center tap, and circuit means for connecting the source of said second error signal across the other of said end terminals and said center tap, whereby a residual flux is established in said core that results in both of said error signals being reduced substantially to zero.

3. Control circuitry comprising a high-retentivity ferromagnetic core having a gap interrupting its continuity, a semiconductor plate exhibiting the Hall effect, said plate having a pair of input terminals and a pair of output terminals and being situated in said gap to intersect the path of magnetic flux flowing in said core, a source of current connected to said input terminals, said input terminals being placed to generate in said plate a voltage related to the flux in said core and due to the Hall effect, said output terminals being placed to sense said voltage generated due to the Hall effect, a reference voltage source, a difference amplifier comprising first and second transistors the collectors of which are provided operating bias, said difference amplifier arranged for comparing in magnitude the voltage appearing across said output terminals of said plate with said reference voltage, a coil having end terminals and a center tap and which is wound around said core, said reference source connected across the base of said first transistor and said center tap, said output terminals of said slab connected across the base of said second transistor and said center tap, means for connecting the emitter of said first transistor to one of said end terminals, and means for connecting the emitter of said second transistor to the other of said end terminals, said difference amplifier and said coil thereby providing means responsive to differences in said output and reference voltages for changing the residual flux passing through said core in a sense to decrease said differences.

4. Apparatus comprising a delay line, an input circuit connected to said delay line, taps situated along the length of said delay line, a utilization circuit, and multipliers individual to said taps each comprising a high-retentivity ferromagnetic core having a gap interrupting its continuity, a semicoductor slab exhibiting the Hall effect situated in said gap to intersect the path of flux flowing therein, a pair of input terminals connected to opposite ends of said slab such that current flows between said input terminals transverse to said flux path, means for coupling said tap to said input terminals, a pair of output terminals connected to opposite ends of said slab such that current flows between said output terminals transverse to said flux path and transverse to current flowing between said input terminals, said output terminals being coupled to said utilization circuit, and core setting circuitry disconnectable from the foregoing circuitry comprising a source of reference voltage representative of the factor by which the multiplier is to multiply tap signals, a source of direct-current connected to said input terminals for developing a voltage across said output terminals proportional to the residual flux existing in said core, means for generating an error signal proportional to the difference between said reference voltage and said developed voltage, and means responsive to said error signal for changing the residual flux existing in said core in a sense to decrease the difference between said last-mentioned voltages.

5. Control circuitry comprising a square-loop ferromagnetic core having a gap interrupting its continuity, a semiconductor slab exhibiting the Hall effect situated in said gap to intersect the path of flux flowing therein, a pair of input terminals connected to opposite ends of said slab such that current flows between said input terminals transverse to said flux path, a pair of output terminals connected to opposite ends of said slab such that current flows between said output terminals transverse to said flux path and transverse to current flowing between said input terminals, a direct-current current source connected across said input terminals, a source of direct-current reference signals representative of a residual flux to be established in said core, a coil having end terminals and a center tap wound around said core, a difference amplifier comprising first and second transistors the collectors of which are provided operating bias, said reference source connected across the base of said first transistor and said center tap, said output terminals of said slab connected across the base of said second transistor and said center tap, means for connecting the emitter of said first transistor to one of said end terminals, and means for connecting the emitter of said second transistor to the other of said end terminals.

6. A transversal filter comprising a delay line, an input circuit connected to said delay line, taps situated along the length of said delay line, a utilization circuit, and multipliers individual to said taps each comprising a square-loop ferromagnetic core having a gap interrupting its continuity, a semiconductor slab exhibiting the Hall effect situated in said gap such that said slab intersects the path of flux transversing said gap, a pair of input terminals connected to opposite ends of said slab such that current flows between said input terminals transverse to said flux path, means for coupling said tap to said input terminals, a pair of output terminals connected to opposite ends of said slab such that current flows between said output terminals transverse to said flux path and transverse to current flowing between said input terminals, said output terminals coupled to said utilization circuit, and core setting circuitry disconnectable from the foregoing circuitry comprising a source of reference voltage representative of the factor by which the multiplier is to multiply tap signals, a source of direct-current current connected to said input terminals, means for comparing said reference voltage with the voltage produced across said output terminals responsive to the current from said direct-current source, and means responsive to the difference between said last-named voltages for adjusting the residual flux in said core to counteract said difference.

References Cited by the Examiner

UNITED STATES PATENTS

| | | | |
|---|---|---|---|
| 2,897,352 | 7/1959 | Smith-Vaniz | 334—12 |
| 3,131,381 | 4/1964 | Bradley | 340—174 |
| 3,155,844 | 11/1964 | Auld | 307—88.5 |

HERMAN KARL SAALBACH, *Primary Examiner.*

P. GENSLER, *Assistant Examiner.*